(12) United States Patent
Trent et al.

(10) Patent No.: US 6,434,827 B1
(45) Date of Patent: Aug. 20, 2002

(54) METHOD FOR CREATING A GEAR ASSEMBLY

(75) Inventors: Matthew Thomas Trent, South Lyon; Gregory Dean Gardner, Livonia, both of MI (US)

(73) Assignee: Ford Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/573,761

(22) Filed: May 18, 2000

(51) Int. Cl.[7] ............................................... B21D 33/28
(52) U.S. Cl. ...................................... 29/893.1; 475/331
(58) Field of Search ............................ 29/893.1, 464; 475/331

(56) References Cited

U.S. PATENT DOCUMENTS 594,219 A * 11/1897 Tredwell ................... 29/893.1
2,679,089 A * 5/1954 Opitz et al. ................ 29/893.1
4,793,214 A * 12/1988 Nurnberger et al. ....... 29/893.1
5,233,757 A * 8/1993 Maguire .................... 29/893.1

\* cited by examiner

Primary Examiner—P. W. Echols
(74) Attorney, Agent, or Firm—Ford GLobal Tech., Inc.

(57) ABSTRACT

A method for producing a gear assembly 108 which allows for the relatively efficient transfer of energy. Assembly 108 is created by forming a first member 10 and a second member 40, by placing pinion support members 80 within the second member 40, by placing gear assemblies or pinions 63 upon each of the pinion support members 80, and by coupling the pinion support members 80 to the first member 10, thereby forming gear assembly 108.

16 Claims, 5 Drawing Sheets

METHOD FOR CREATING A GEAR ASSEMBLY

(1) FIELD OF THE INVENTION

The present invention generally relates to a method for creating a gear assembly and more particularly, to a method for creating a Ravigneaux and/or compound type gear assembly which may be selectively and operatively deployed within a vehicle.

(2) BACKGROUND OF THE INVENTION

Gear assemblies are generally used in a wide variety of applications requiring the selective coupling or connection of several members and/or the selective coupling or transfer of energy to one or more members or assemblies. One type of gear assembly which is conventionally used within a vehicle to achieve this desired coupling and/or energy transfer is often referred to as a Ravigneaux and/or a compound type gear assembly.

Particularly, a Ravigneaux and/or compound type assembly includes several "planetary" type gears which are movably disposed within a housing and which are adapted to selectively and movably receive and interconnect to at least one "sun" type gear and at least one ring type gear. Particularly, the sun gear and the planetary gears are coupled to various respective portions of the vehicle and this selective interconnection allows these various vehicular portions to be connected. Further, the received sun gear is typically and movably coupled to a source of torque or rotational energy and the foregoing arrangement allows the torque or rotational energy to be transferred from the sun gear to these other planetary gears. Alternatively, energy may be transferred to the sun gear from the planetary gears and/or to the various portions of the vehicle which are coupled to these planetary gears and/or to the sun gear.

While these Ravigneaux and/or compound type assemblies do allow energy or torque to be transferred to various portions of a vehicle, they suffer from some drawbacks. For example and without limitation, these assemblies are relatively difficult to manufacture since these assemblies require a relatively large number of components which must be intricately interconnected. Further, each of these components must be produced in accordance with respective and relatively precise tolerance limits or tolerance type bands. Should one or a few of these components "violate" a respective tolerance requirement, the assembly may become inoperable or substantially incapable of being assembled.

Further, many of these assemblies inefficiently transfer the received energy due to relatively "loose" fitting components (i.e., gear receiving pinion support members).

That is, these pinion support members are typically placed into relatively small openings which are typically created within the formed assembly. Particularly, these openings are created by the use of relatively long instruments which, due to their relatively long length and the required small diameter, tend to form relatively inaccurate openings which allow the received pinion support members to undesirably move, thereby undesirably wasting energy, reducing overall operating life, causing an undesirably "noisy" operation and further causing undesirable vibration.

While some attempts have been made to increase the accuracy of the produced openings by the use of alignment dowels, this approach undesirably increases the overall complexity of the manufacturing process.

Moreover, in most of these previously delineated configurations, the pinion support members are "slip fitted" into the assembly before they are operatively inserted into the created and relatively small openings, by use of relatively large openings. While these relatively large openings allow the pinion support members to be easily inserted into the assembly, they further allow the pinion support members to undesirably move and further allow energy to be wasted and the overall assembly operating life to be reduced.

There is therefore a need for a new and improved method for creating a Ravigneaux and/or compound type assembly which overcomes some or all of the previously delineated drawbacks of current Ravigneaux and/or compound type assemblies.

SUMMARY OF THE INVENTION

It is a first object of the present invention to provide a method for creating a Ravigneaux and/or compound type assembly which overcomes some or all of the previously delineated drawbacks of existing assemblies.

It is a second object of the present invention to provide a method for creating a Ravigneaux and/or compound type assembly which overcomes some or all of the previously delineated drawbacks of existing assemblies and which, by way of example and without limitation, efficiently transfers torque.

It is a third object of the present invention to provide a method for creating a Ravigneaux and/or compound type assembly which overcomes some or all of the previously delineated drawbacks of existing assemblies and which, by way of example and without limitation, may be efficiently manufactured and/or produced.

It is a fourth object of the present invention to provide a method for creating a relatively stiff Ravigneaux and/or compound type assembly which overcomes some or all of the previously delineated drawbacks of prior assemblies.

According to a first aspect of the present invention, a method for creating a gear assembly is provided. The method includes the steps of forming a first member; forming a second member; placing pinion support members within the second member; placing a gear upon each of the pinion support members; placing the first member upon the second member; and coupling the second member to the first member.

These and other aspects, features, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
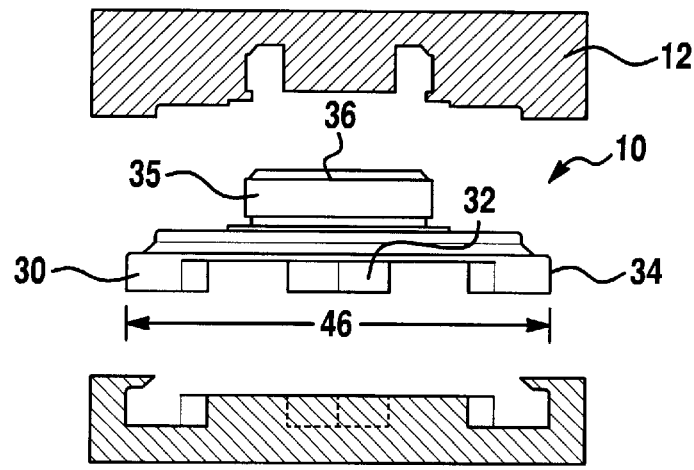
FIG. 1 is side view of a first portion of a gear assembly being formed in accordance with the teachings of the preferred embodiment of the invention.
Figure 5:
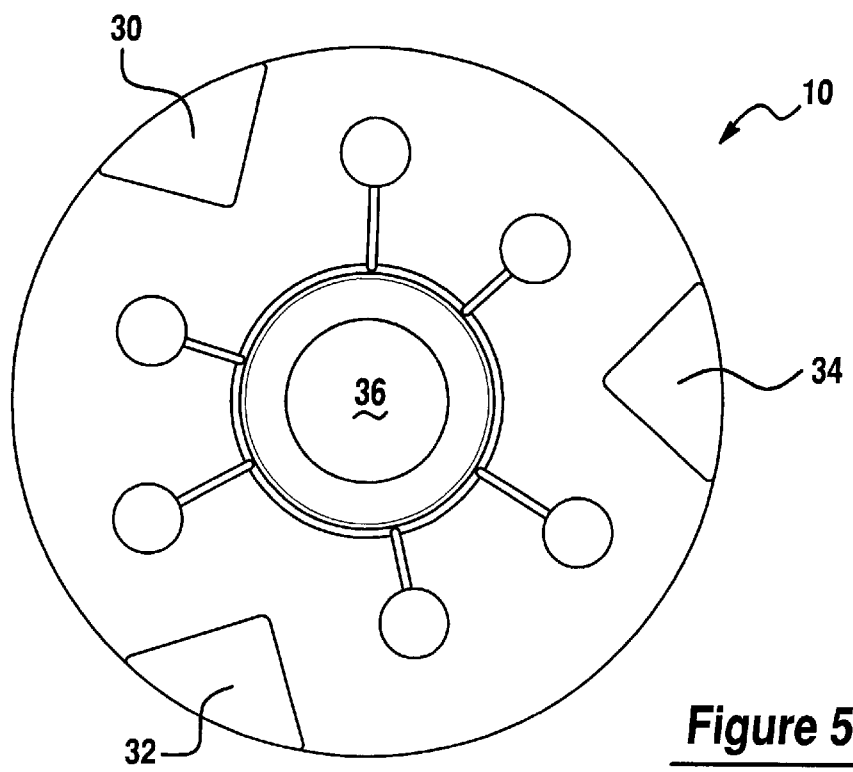
FIG. 5 is bottom view of the formed first portion of the gear assembly.
Figure 6:
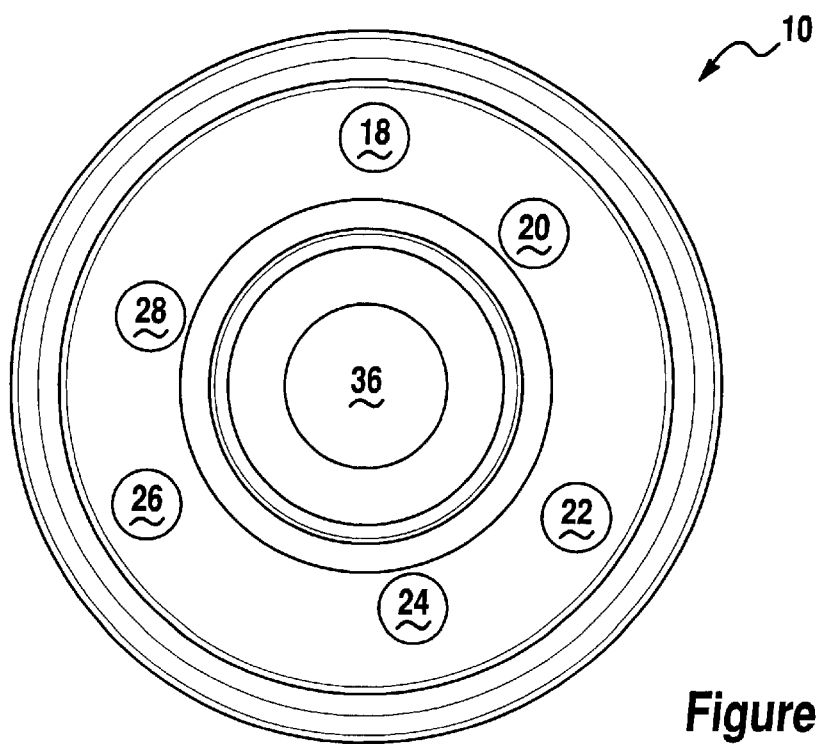
FIG. 6 is a top view of the formed first portion of the gear assembly.

Referring now to FIGS. 1, 5, and 6, there is shown a top or first portion 10 of a gear assembly which is made in accordance with the teachings of the preferred embodiment of the invention. Particularly, top portion 10 may be formed by use of a mold 12 (such as an injection type mold) and is generally round. Further, top portion 10 includes several substantially identical orifices or openings 18, 20, 22, 24, 26, and 28. It should be appreciated that the invention is not limited to the use of six such orifices 18–28 and that these orifices 18–28 may be selectively dissimilar and positioned upon member 10 in a pattern which differs from that which is shown in the various attached figures. Top member 10 further includes substantially identical and generally triangular raised or ridge portions 30, 32, and 34 and a central generally circular raised member 35 having an orifice 36. It should also be appreciated that the invention is not to be limited to the use of three such generally triangularly shaped raised or ridge portions 30–34 or to the use of a single central orifice 36.

Figure 2:
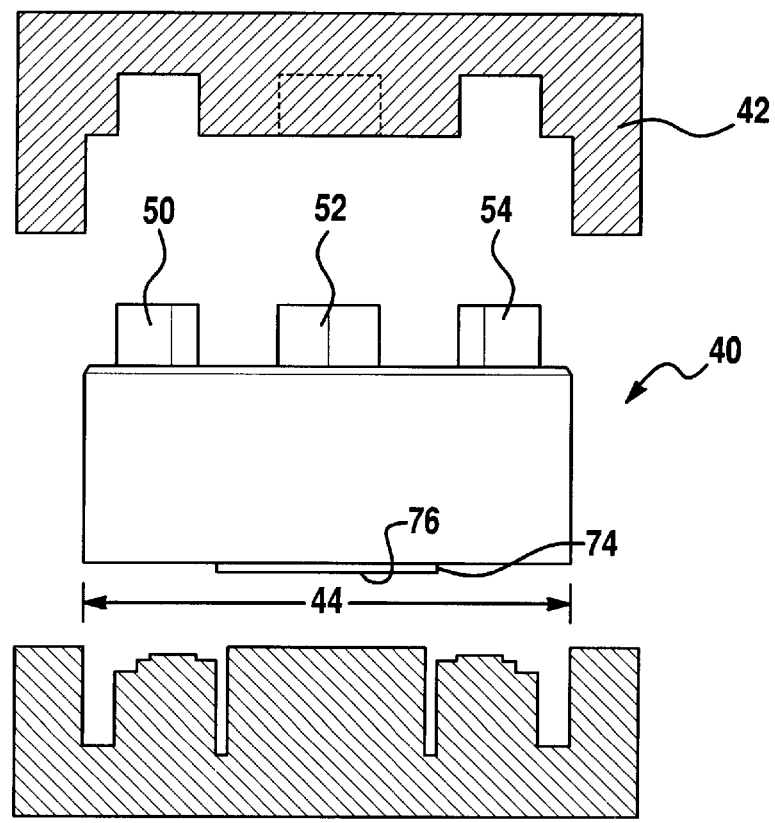
FIG. 2 is a side view of a second portion of the gear assembly being formed in accordance with the teachings of the preferred embodiment of the invention.
Figure 3:
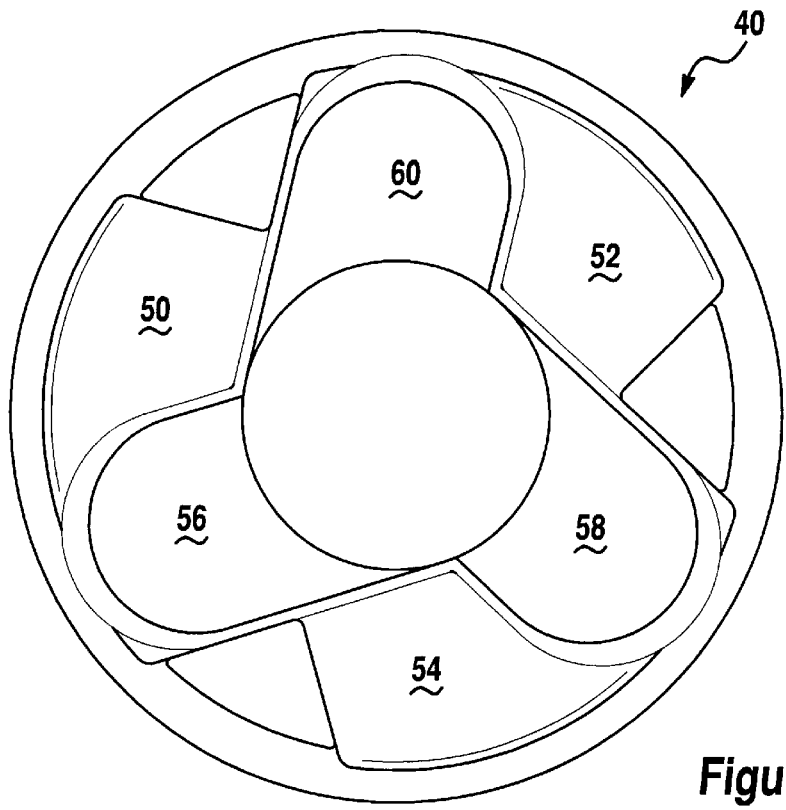
FIG. 3 is a top view of the formed second portion of the gear assembly after it has been subjected to a certain step of the methodology of the preferred embodiment of the invention.
Figure 4:
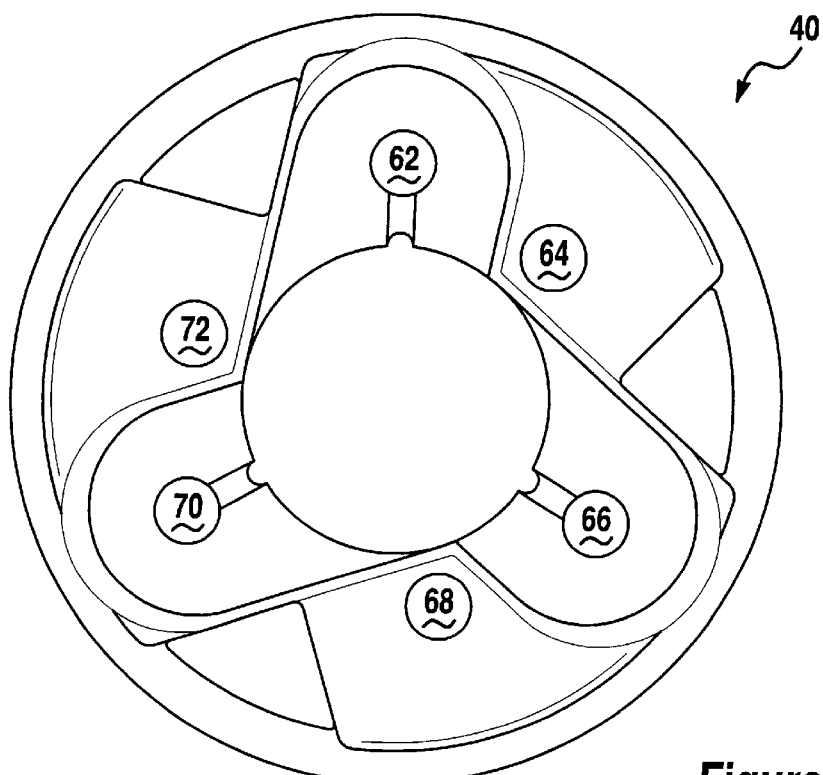
FIG. 4 is a top view of the formed second portion of the gear assembly after it has been subjected to a certain further step of the methodology of the preferred embodiment of invention.

Referring now to FIGS. 2, 3, and 4 there is shown a bottom or second portion 40 of a gear assembly which is made in accordance with the teachings of the preferred embodiment of the invention. Particularly, portion 40 may be created by use of mold 42 (such as an injection mold) and is generally round or circular. In one non-limiting embodiment of the invention, the diameter 44 of portion 40 is substantially equal to the diameter 46 of portion or member 10.

Member 40 further includes three substantially identical and generally triangularly shaped ridge or raised portions 50, 52, and 54 which are each substantially similar to portions 30, 32, and 34. The molded member 40 may be subjected to a "machining operation" which is effective to produce three substantially identical "pockets" 56, 58, and 60 and the three ridge portions 50, 52, and 54. Alternatively, these ridge portions 50, 52, and 54 and the pockets 56, 58, and 60 may be formed within the member 40 by use of mold 42. Further, member 40 includes substantially identical orifices or openings 62, 64, 66, 68, 70, and 72 which are substantially identical to orifices 18–28 and an extended portion 74 having an orifice 76. These orifices 62, 64, 66, 68, 70, and 72 and the portion 74 may also be formed by use of mold 42 or may be created by use of a separate "machining operation".

Figure 7:
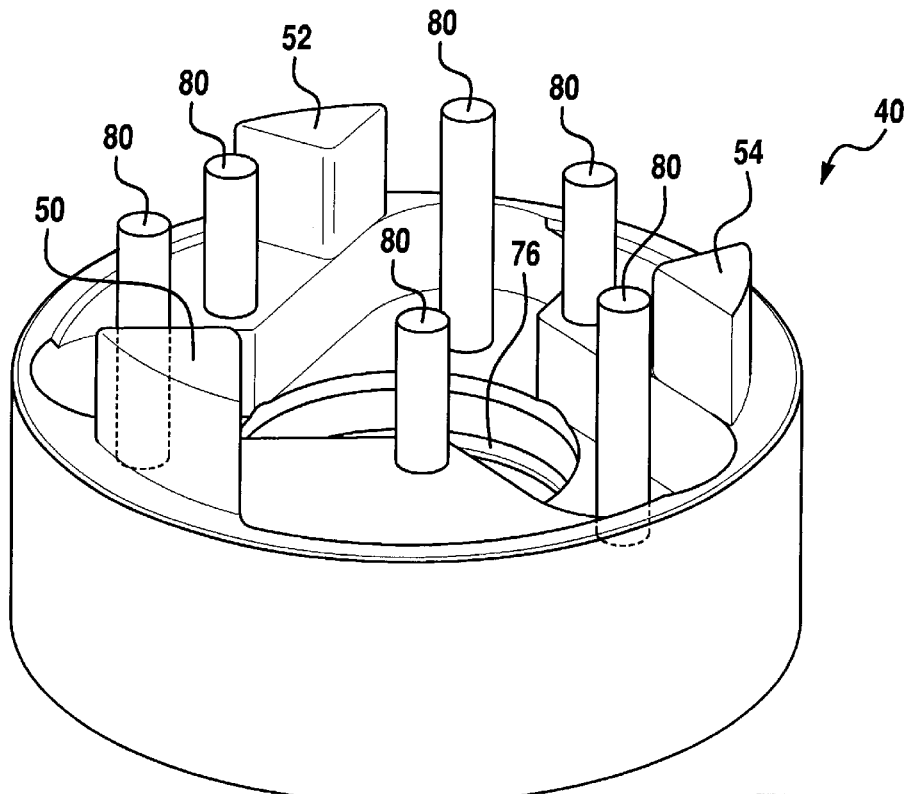
FIG. 7 is a perspective view of the second portion of the gear assembly which is shown in FIG. 4 after it has been subject to yet another step of the methodology of the preferred embodiment of the invention.
Figure 8:
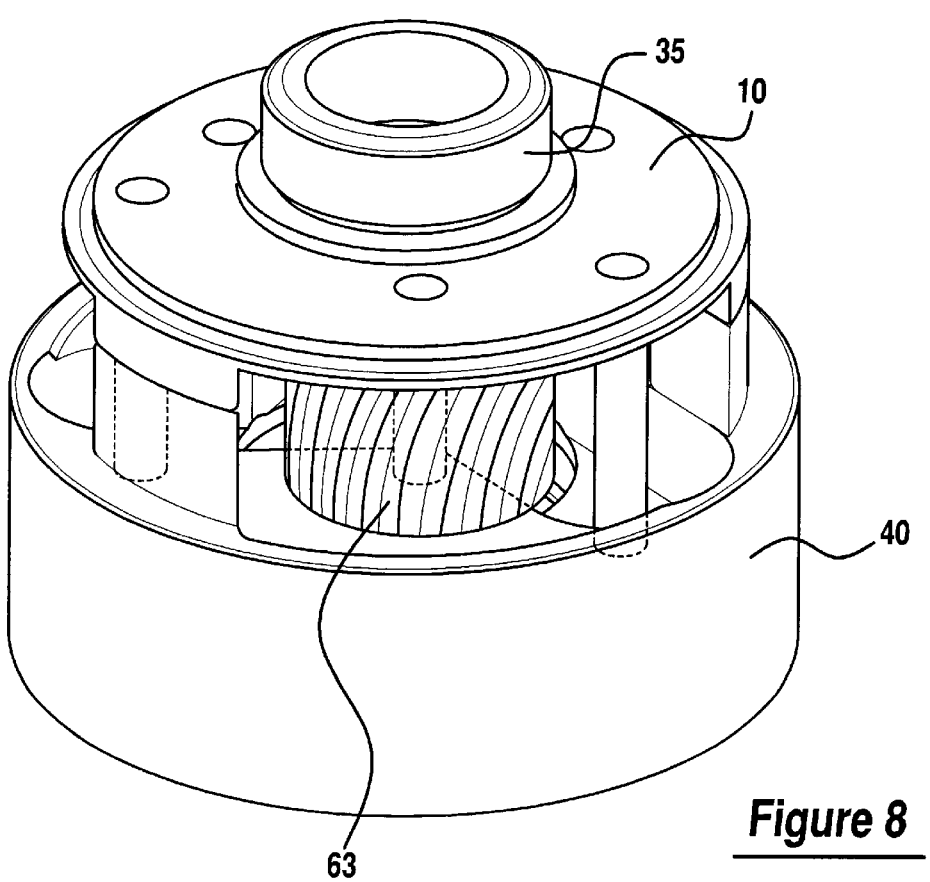
FIG. 8 is a perspective view of the assembly and/or interconnection of the first and second portions in accordance with a further step of the methodology of the preferred embodiment of the invention.

After the portions or members 10 and 40 have been formed, a pinion support member 80 is placed within each of the formed orifices or openings 62, 64, 66, 68, 70, and 72, as best shown in FIG. 7. Then, as shown in FIG. 8, a planetary pinion gear assembly, such as pinion assembly 63, is movably and operatively placed upon each pinion support member 80 and each gear containing pinion support member is further received within a unique one of the orifices 18–28, thereby securing member or portion 10 onto member or portion 40 and operatively securing the planetary pinions assemblies, such as pinion assembly 63, within the formed assembly.

Figure 9:
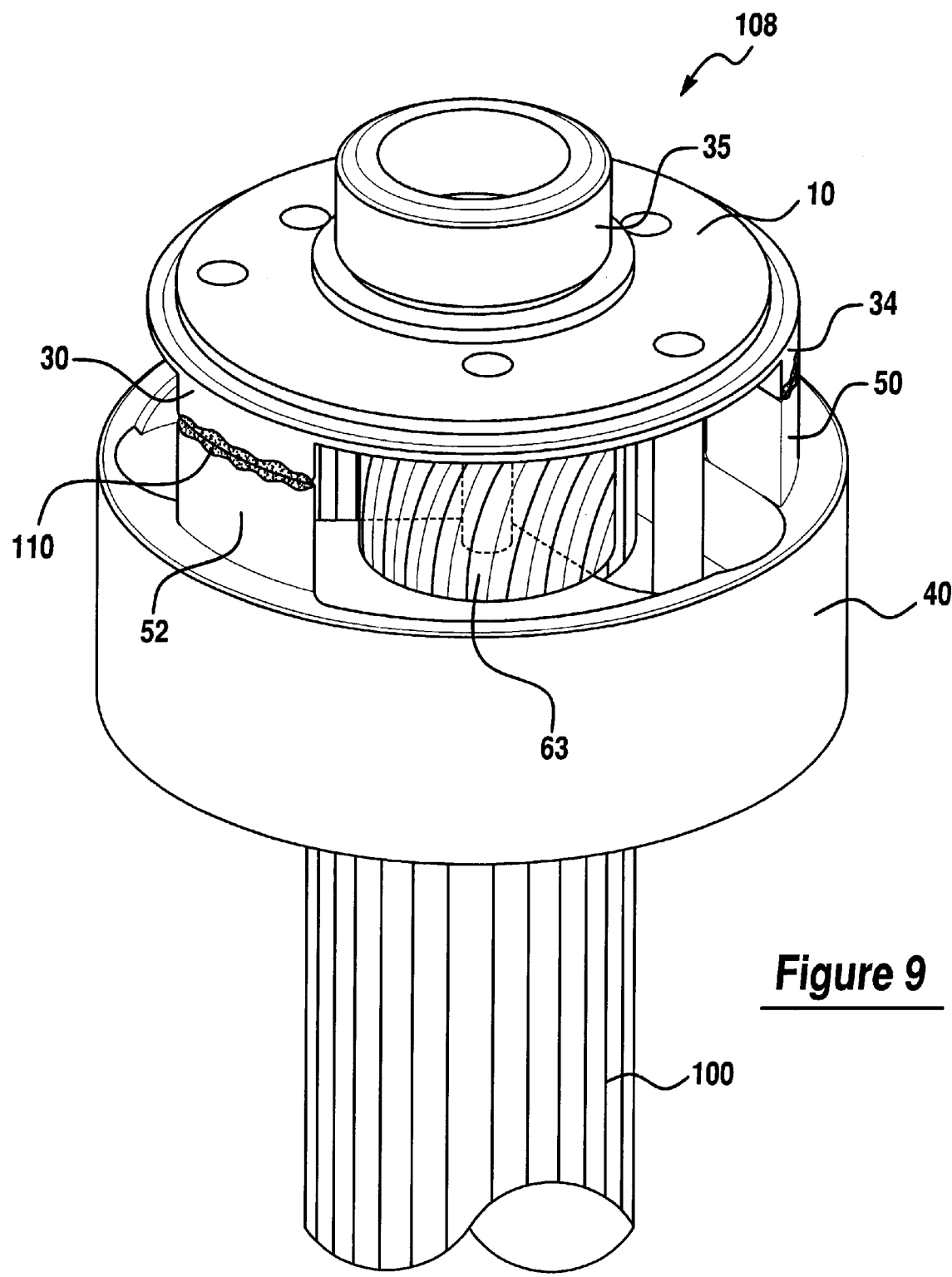
FIG. 9 is a perspective view of the coupling of the assembled first and second portions in accordance with a final step of the methodology of the preferred embodiment of the invention.

As shown best in FIG. 9, mating member pairs 30, 52; 32, 54; and 34, 50 are laser welded or coupled by some other methodology, as a sun gear 100 is inserted into the orifice 76 and rotated, effective to movably engage each of the contained planetary pinion assemblies 63 until the laser welding step or operation is completed, thereby forming a gear assembly 108. In this manner, the members or portions 10 and 40 do not tend to "twist", thereby substantially allowing the formation of the laser welded connection 110.

It is to be understood that the invention is not to be limited to the exact construction or method which has been illustrated and discussed above, but that various changes and modifications may be made without departing from the spirit and the scope of the inventions as are more fully delineated in the following claims. It should be further appreciated that the foregoing methodology allows the formation of a gear assembly 108 in a relatively efficient manner and without the need for "slip fitting" pinion support members 80 within the formed assembly 110 and without the need for a relatively long instrument to form relatively small openings in the assembly 108. Further, it should be appreciated that the foregoing assembly 108 has relatively few components and therefore is relatively easy to manufacture and service and allows for the relatively efficient coupling of two or more members and for the efficient transfer of torque. Lastly, it should be appreciated that pinion support members 80 are adapted and do align the top member 10 with the bottom member 40, thereby obviating the need for alignment dowels, thereby further reducing the complexity of the overall manufacturing process.

What is claimed is:

1. A method for creating a gear assembly comprising the steps of:

creating a first member;

creating a second member;

placing at least one support member within said first member;

placing a gear upon said at least one support member;

coupling said first member to said second member; and rotating said gear as said first member is coupled to said second member, thereby creating said gear assembly.

2. The method of claim 1 wherein said step of rotating said gear comprises the steps of:

providing a second gear; and movably coupling said second gear to said first gear.

3. The method of claim 2 wherein said second gear comprises a sun gear.

4. The method of claim 3 wherein said first gear comprises a planetary gear.

5. A method for forming a gear assembly comprising the steps of:

forming a first circular member having a plurality of protruding ridge portions;

forming a second circular member having a plurality of second ridge portions;

forming a plurality of openings within the second circular member;

placing a support member in each of said plurality of openings;

forming a second plurality of openings within the first circular member;

placing a gear upon each of said support members;

placing each of said support members in a unique one of said second plurality of openings; and coupling said first circular member to said second circular member.

6. The method of claim 5 wherein said step of coupling said first circular member to said second circular member comprises the step of welding said first circular member to said second circular member.

7. The method of claim 6 wherein said welding comprises laser welding.

8. The method of claim 6 wherein each of said first and second plurality of openings are substantially identical.

9. The method of claim 6 further comprising the step of rotating said gears as said first circular member is coupled to said second circular member.

10. A method for creating a gear assembly comprising the step of:

creating a first member having a plurality of openings and at least one ridge portion;

creating a second member having a second plurality of openings and at least a second ridge portion;

placing a pinion support member into each of said second plurality of openings;

placing a pinion on each of said pinion support members;

placing each of said pinion support members into a unique one of said plurality of openings;

abutting said at least one ridge portion to said at least a second ridge portion;

joining said at least one ridge portion to said at least a second ridge portion as said pinion is rotated.

11. The method of claim 10 wherein said at least one ridge portion and said at least a second ridge portion are triangular.

12. The method of claim 10 wherein said at least one ridge portion is welded to said at least a second ridge portion.

13. The method of claim 10 wherein each of said pinion support members is substantially identical.

14. The method of claim 10 wherein said pinion is rotated by use of a sun gear.

15. The method of claim 4 wherein said pinion comprises a planetary gear.

16. The method of claim 10 wherein said first and second members have a substantially similar diameter.

* * * * *